(12) United States Patent
Jarzomski et al.

(10) Patent No.: US 11,095,184 B2
(45) Date of Patent: Aug. 17, 2021

(54) MAGNETIC SEAL FOR MAGNETICALLY-RESPONSIVE DEVICES, SYSTEMS, AND METHODS

(71) Applicant: LORD Corporation, Cary, NC (US)

(72) Inventors: Michael Jarzomski, Apex, NC (US); Askari Badre-Alam, Cary, NC (US)

(73) Assignee: LORD Corporation, Cary, NC (US)

( * ) Notice: Subject to any disclaimer, the term of this patent is extended or adjusted under 35 U.S.C. 154(b) by 96 days.

(21) Appl. No.: 16/322,003

(22) PCT Filed: Aug. 23, 2016

(86) PCT No.: PCT/US2016/048137
§ 371 (c)(1),
(2) Date: Jan. 30, 2019

(87) PCT Pub. No.: WO2018/038708
PCT Pub. Date: Mar. 1, 2018

(65) Prior Publication Data
US 2019/0181716 A1    Jun. 13, 2019

(51) Int. Cl.
*H02K 5/12*        (2006.01)
*H02K 5/124*     (2006.01)
*H02K 1/24*       (2006.01)
*H02K 5/16*       (2006.01)
*H02K 7/08*       (2006.01)
(Continued)

(52) U.S. Cl.
CPC ........... *H02K 5/124* (2013.01); *F16D 57/002* (2013.01); *H02K 1/246* (2013.01); *H02K 5/161* (2013.01); *H02K 7/083* (2013.01); *F16D 2121/20* (2013.01)

(58) Field of Classification Search
CPC ........ H02K 5/124; H02K 1/246; H02K 5/161; H02K 7/093; F16D 57/002
USPC .................................................... 310/90.5, 85
See application file for complete search history.

(56) References Cited

U.S. PATENT DOCUMENTS

| | | |
|---|---|---|
| 2,824,460 A | 2/1958 | Davis |
| 3,254,745 A | 6/1966 | Isakov et al. |
| 3,788,275 A | 1/1974 | Hanson |

(Continued)

FOREIGN PATENT DOCUMENTS

| | | |
|---|---|---|
| CN | 1 796 054 A | 7/2006 |
| CN | 10 0534726 C | 9/2009 |

(Continued)

OTHER PUBLICATIONS

International Search Report and Written Opinion for Application No. PCT/US2016/048137 dated May 16, 2017.

(Continued)

*Primary Examiner* — Terrance L Kenerly
(74) *Attorney, Agent, or Firm* — Jenkins, Wilson, Taylor & Hunt, P.A.

(57) ABSTRACT

A magnetically-responsive device (100) having a magnetic seal (160,170) to retain magnetically responsive material within a defined space (150) is provided. The magnetically-responsive device (100) has a shaft (110), a rotor (130), a magnetic field generator (145), a magnetically-responsive medium and a magnetic seal (160,170). The seal (160,170) is preferably a non-contact seal (160,170) that does not deteriorate over time and generates little to no resistance.

15 Claims, 6 Drawing Sheets

(51) Int. Cl.
*F16D 57/00* (2006.01)
*F16D 121/20* (2012.01)

(56) References Cited

U.S. PATENT DOCUMENTS

| | | | |
|---|---|---|---|
| 4,239,092 | A | 12/1980 | Janson |
| 4,575,103 | A | 3/1986 | Pedu |
| 4,681,197 | A | 7/1987 | Pedu |
| 4,844,220 | A | 7/1989 | Maji et al. |
| 4,856,631 | A | 8/1989 | Okamoto et al. |
| 5,100,159 | A | 3/1992 | Bras et al. |
| 5,173,814 | A | 12/1992 | Elsasser et al. |
| 5,469,008 | A | 11/1995 | Nakajima et al. |
| 5,816,372 | A | 10/1998 | Carlson et al. |
| 5,831,355 | A | 11/1998 | Oku |
| 5,885,005 | A | 3/1999 | Nakano et al. |
| 5,969,589 | A | 10/1999 | Raj |
| 6,029,978 | A * | 2/2000 | Pelstring .......... F16J 15/43 277/410 |
| 6,466,119 | B1 | 10/2002 | Drew |
| 6,543,781 | B1 | 4/2003 | Rehm et al. |
| 6,755,290 | B1 | 6/2004 | Dolan |
| 6,823,971 | B2 | 11/2004 | Takeda et al. |
| 6,841,908 | B2 | 1/2005 | Hasegawa et al. |
| 6,942,081 | B2 | 9/2005 | Wen et al. |
| 7,113,365 | B1 | 9/2006 | Ryan et al. |
| 7,208,854 | B1 * | 4/2007 | Saban ................. H02K 1/32 310/61 |
| 7,216,723 | B2 | 5/2007 | Ohtsu et al. |
| 7,671,582 | B2 | 3/2010 | Yabe et al. |
| 7,872,553 | B2 | 1/2011 | Fremerey |
| 8,215,467 | B2 | 7/2012 | Smith |
| 10,087,996 | B2 | 10/2018 | Berthelemy |
| 2003/0155201 | A1 | 8/2003 | Bowen |
| 2004/0188198 | A1 | 9/2004 | Na |
| 2006/0137887 | A1 | 6/2006 | Ohtsu et al. |
| 2008/0116757 | A1 | 5/2008 | Chang et al. |
| 2010/0019514 | A1 | 1/2010 | Steinwender |
| 2010/0027927 | A1 | 2/2010 | Koyagi et al. |
| 2010/0231069 | A1 | 9/2010 | Liao et al. |
| 2013/0293051 | A1 | 11/2013 | Deits et al. |
| 2015/0184497 | A1 | 7/2015 | Whitby |
| 2017/0089408 | A1 | 3/2017 | Berthelemy |
| 2019/0178316 | A1 | 6/2019 | Jarzomski et al. |

FOREIGN PATENT DOCUMENTS

| | | |
|---|---|---|
| CN | 103051151 A | 4/2013 |
| CN | 104242597 A | 12/2014 |
| CN | 103051151 B | 9/2015 |
| CN | WO 2018/039301 A1 | 3/2018 |
| CN | 109643930 A | 4/2019 |
| CN | 109690917 A | 4/2019 |
| EP | 1 677 022 | 7/2006 |
| GB | 2 273 395 | 6/1994 |
| JP | 2000/088004 | 3/2000 |
| WO | 00/45498 | 8/2000 |
| WO | 2015/113564 | 8/2015 |
| WO | WO 2018/038708 A1 | 3/2018 |

OTHER PUBLICATIONS

International Search Report and Written Opinion for Application No. PCT/US2017/048132 dated Nov. 29, 2017.
Non-Final Office Action for U.S. Appl. No. 16/321,926 dated Apr. 8, 2020.
European Office Action for U.S. Appl. No. 16770586.2 dated Apr. 16, 2020.
European Office Action for Application No. 17758417.4 dated Apr. 16, 2020.
Chinese Office Action for Application No. CN201780051867.1 dated Apr. 17, 2020.
Chinese Office Action for Application No. CN201680088659.4 dated Jun. 8, 2020.
Final Office Action for U.S. Appl. No. 16/321,926 dated Oct. 16, 2020.
Advisory Action and After Final Consideration Program Decision for U.S. Appl. No. 16/321,926 dated Dec. 30, 2020.
Chinese Office Action for Application No. 201780051867.1 dated Jan. 13, 2021.
Chinese Office Action for Application No. 201680088659 dated Feb. 24, 2021.
European Office Action for Application No. 17758417.4 dated Mar. 9, 2021.
European Office Action for Application No. 16770586.2 dated Mar. 9, 2021.
Notice of Allowance for U.S. Appl. No. 16/321,926 dated Apr. 5, 2021.
Corrected Notice of Allowance for U.S. Appl. No. 16/321,926 dated Apr. 15, 2021.

* cited by examiner

MAGNETIC SEAL FOR MAGNETICALLY-RESPONSIVE DEVICES, SYSTEMS, AND METHODS

TECHNICAL FIELD

The subject matter disclosed herein relates generally to magnetically-responsive systems. More particularly, the subject matter disclosed herein relates to seals for use with magnetically-responsive systems to prevent the migration of magnetically-responsive material out of the systems.

BACKGROUND

Mechanical systems that incorporate magnetically-responsive (MR) materials therein can provide controllable feedback to applied forces or torques. Such systems can provide a range of benefits, for example, in tactile feedback devices in steer-by-wire systems in which torque feedback to the operator is generated when a rotor attached to a shaft shears MR material against a fixed stator. In such systems, tactile feedback device steering units can utilize a fine magnetically responsive (MR) material (iron powder) to provide smooth torque, proportional to current and independent of temperature. The typical functionality of a tactile feedback device includes torque feedback, position (rotational) sensing, and structure.

In order to provide structure and rotational motion, bearings or bushings are generally used to support the output shaft. Traditional bearings and bushings are susceptible, however, to binding in failure when contaminated by MR powders. When powder enters the bearing, the bearing has a tendency to seize or provide "stiff steering" at the operator interface. This failure mode has driven the development of special seals that are designed to mitigate leak paths that contribute to contamination. For example, current solutions include compressed felt, labyrinth seals, radial lip seals, and axial lip seals.

Although current applications have been tested and passed designated durability life tests, intermittent failures and new design configurations have limited the technology. Accordingly, it is desirable for improved sealing structures for a MR system to better prevent the leakage of MR materials out of the system and thereby provide more robust protection of associated bearings.

SUMMARY

In accordance with this disclosure, magnetic seals for magnetically-responsive devices, systems, and methods are provided. In one aspect, a magnetically-responsive device is provided. The magnetically-responsive device comprises a shaft, a rotor, a magnetic field generator, a magnetically-responsive medium and a magnetic seal. The rotor comprises a highly magnetically permeable material, the rotor being interconnected to the shaft to restrain relative rotation therebetween. The magnetic field generator is separated from the rotor by a void. The magnetically-responsive medium is contained within and at least partially filling the void, wherein the magnetic field generator is controllable to cause the magnetically-responsive medium to align along the flux path within the void and thereby cause a change in torsional resistance of the rotor. The magnetic seal is axially spaced from the rotor and positioned at or near the shaft, the magnetic seal comprising a magnetic element configured to generate a magnetic field to prevent passage of the magnetically-responsive medium out of the void.

In another aspect, a shaft seal apparatus is provided. The seal shaft apparatus comprises a magnetic seal is configured to be positioned at or near a rotatable shaft. The magnetic seal comprises a magnetic element configured to generate a magnetic field to prevent passage of magnetically-responsive medium along a rotatable shaft.

In yet another aspect, a method for preventing passage of a magnetically-responsive medium out of a magnetically-responsive device is provided. The method comprises the steps of positioning a magnetic seal at or near a rotating shaft associated with the magnetic-resistive device and generating a magnetic field to prevent passage of the magnetically-responsive medium along the shaft away from the magnetically-responsive device.

Although some of the aspects of the subject matter disclosed herein have been stated hereinabove, and which are achieved in whole or in part by the presently disclosed subject matter, other aspects will become evident as the description proceeds when taken in connection with the accompanying drawings as best described hereinbelow.

DETAILED DESCRIPTION

The present subject matter provides magnetic seals for magnetically-responsive devices, systems, and methods. The present subject matter provides magnetic seals that are designed to prevent contamination of bearings or bushings by concentrating the magnetic flux in an area that will prevent passage of the magnetically responsive materials. As discussed above, typical sealing methods include axial/radial elastomeric contact seals, and these types of seals do not do well with dry contamination and break down over time. In contrast, non-contacting magnetic seals can retain powder and prevent leakage even with a gap present between the fixed and moving components.

Figure 1:
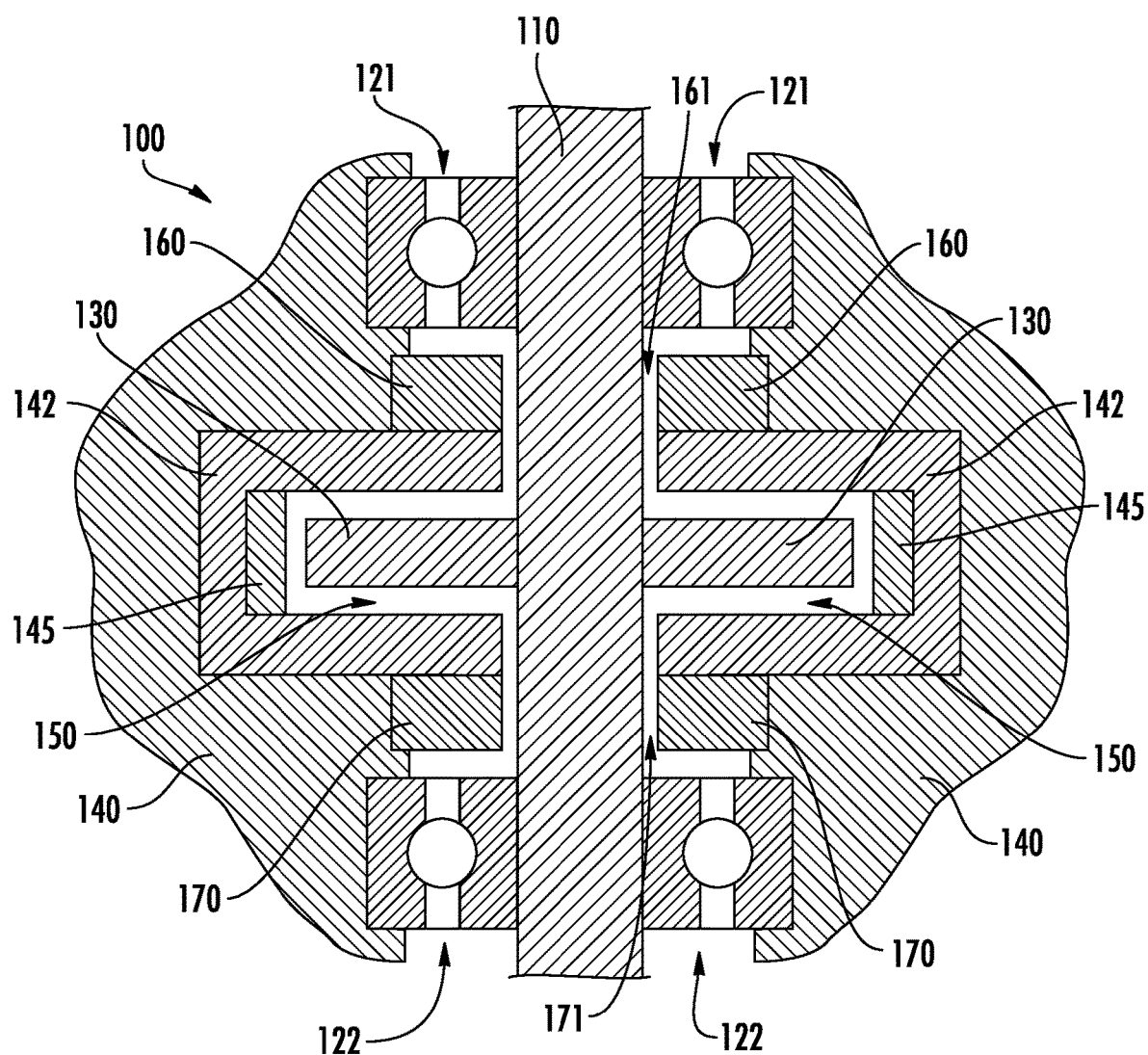
FIG. 1 is a side cutaway view of a magnetically-responsive device that incorporates a magnetic seal according to an embodiment of the presently disclosed subject matter.

In one aspect, the present subject matter provides a magnetically-responsive device and a magnetic seal for use therewith. As shown in FIG. 1, a magnetically-responsive device generally designated 100 includes a shaft 110 and a rotor 130 interconnected to shaft 110 to restrain relative rotation therebetween. In some embodiments, rotor 130 includes a highly-magnetically-permeable material (e.g., a mid/low carbon steel such as AISI-1018). In some embodiments, a housing 140 is positioned substantially about shaft 110 and rotor 130. In addition, one or more pole 142 is attached to or integrated within housing 140, and a magnetic field generator 145 associated with pole 142 is spaced from rotor 130 by a void 150. In some embodiments, magnetic field generator 145 is a fixed stator (e.g., a permanent magnet and/or an electromagnetic coil) that is configured to generate a magnetic field in at least a portion of pole 142 at or near rotor 130.

A magnetically responsive medium (e.g., a magnetically-responsive powder such as iron powder) is contained within and at least partially fills void 150. In this arrangement, magnetic field generator 145 is controllable to cause the magnetically-responsive medium to align along the flux path within void 150 and thereby cause a change in torsional resistance of rotor 130 (and shaft 110). As discussed above, in order to provide structure and rotational motion, bearings or bushings are generally used to support the output shaft. In the configuration shown in FIG. 1, an upper bearing 121 and a lower bearing 122 are positioned on either side of rotor 130 along shaft 110. In order to deal with the issue of MR material intrusion and thus improve the life of magnetically-responsive device 100, a better mechanism for sealing the magnetically responsive medium is provided. As will be discussed in further detail below, a magnetic seal provides such a mechanism.

In the embodiment shown in FIG. 1, an upper magnetic seal 160 is spaced from rotor 130 (i.e., between upper bearing 121 and rotor 130) and positioned at or near shaft 110, and a lower magnetic seal 170 is likewise spaced from rotor 130 (i.e., between lower bearing 122 and rotor 130) and positioned at or near shaft 110. In some embodiments, the spacings between upper bearing 121 and upper magnetic seal 160 and between lower bearing 122 and lower magnetic seal 170 are designed so that the races of upper and lower bearings 121 and 122 do not become magnetized, which can result in the bearings attracting the magnetically-responsive medium.

Figure 2A:
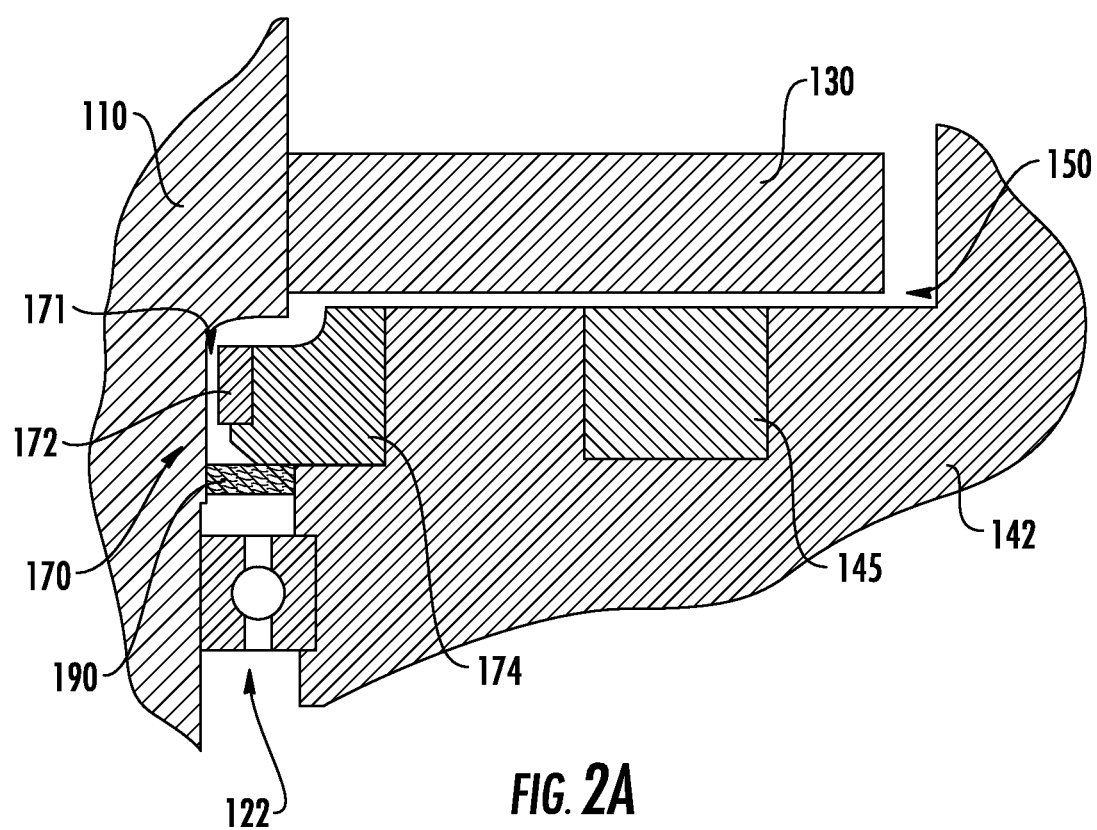
FIG. 2A is a partial side cutaway view of a magnetically-responsive device that incorporates a magnetic seal according to an embodiment of the presently disclosed subject matter.
Figure 2B:
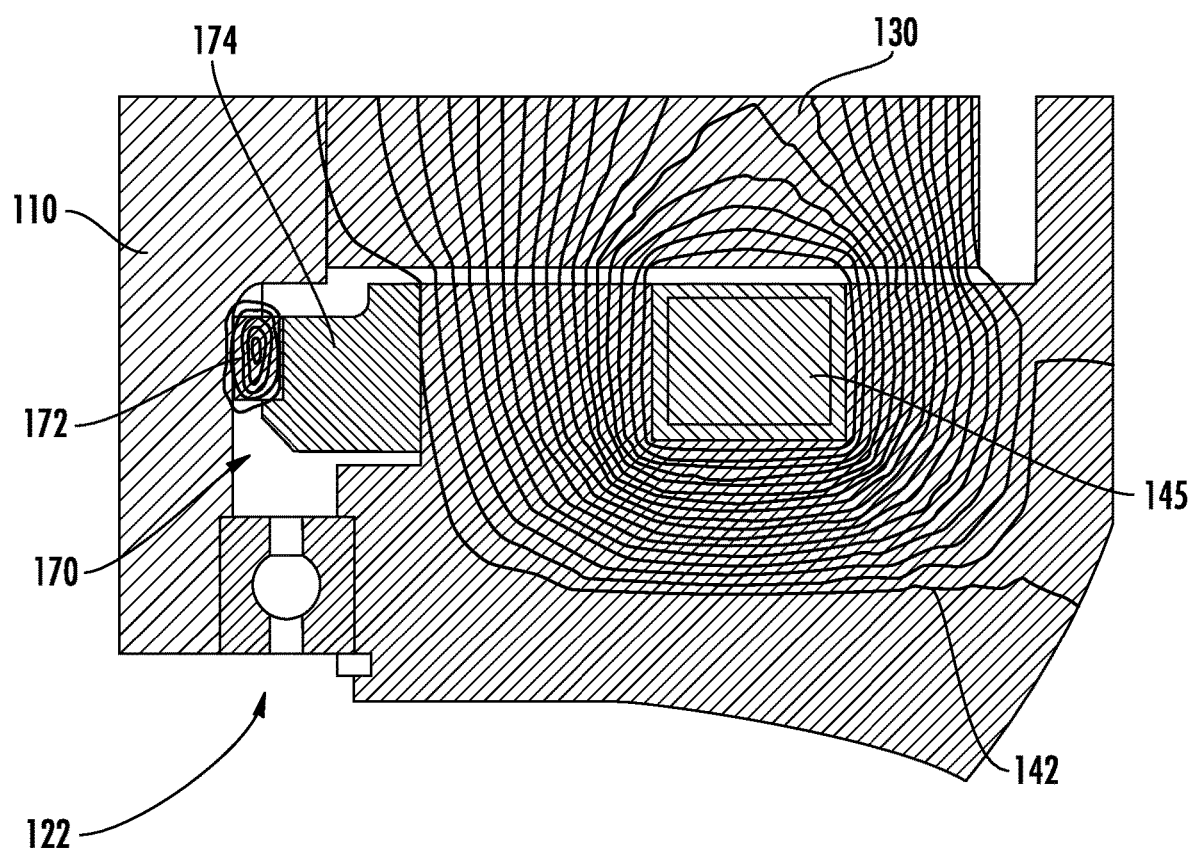
FIG. 2B is a partial side cutaway view of magnetic flux patterns in the magnetically-responsive device shown in FIG. 2A.

Each of upper magnetic seal 160 and lower magnetic seal 170 includes a magnetic element configured to generate a magnetic field to restrict and/or prevent passage of the magnetically-responsive medium out of void 150 and along shaft 110 towards upper and lower bearings 121 and 122. The magnetic seal 160, 170 is separated from the shaft 110 by a gap 161, 171 that prevents contact between the shaft 110 and an internal diameter of the magnetic seal 160, 170. A variety of designs may be utilized to create an ideal circuit. In some embodiments, the magnetic element is a ring magnet (e.g., a Neodymium ring magnet with standard polarity). Referring to an exemplary configuration for lower magnetic seal 170 shown in FIG. 2A, for instance, a ring magnet 172 is positioned between housing 140 and shaft 110. In this configuration, ring magnet 172 is coupled to housing 140 by a magnet holder 174, which is composed of a non-magnetic material (e.g., 6061-T6 Aluminum or similar). In this arrangement, ring magnet 172 can provide its magnetic sealing function without interfering with the operation of magnetic field generator 145 as shown in FIG. 2B. Although reference is made to an exemplary configuration for lower magnetic seal 170, those having skill in the art should recognize that the concepts disclosed herein can be similarly applied to the configuration of upper magnetic seal 160.

In addition to being able to provide a barrier to limit or prevent the passage of the magnetically-responsive medium towards lower bearing 122, the use of a ring magnet can do without contacting shaft 110. As shown in FIGS. 1 and 2A, a small first gap 161 exists between upper magnetic seal 160 and shaft 110, and a second gap 171 exists between lower magnetic seal 170 and shaft 110. As shown, the size of second gap 171 is larger than the molecular/particle size of the magnetically-responsive medium (e.g., approximately 100 micrometers or less), but as discussed above, the seal is designed to impede movement of the magnetically-responsive medium without requiring a physical barrier against shaft 110. Regardless of the size of the gap, the absence of contact resulting from even such a small gap (e.g., a 0.50 mm gap between ring magnet 172 and shaft 110) results in a reduction in the torsional resistance imparted on shaft 110 compared to traditional seals that generally require a pre-load with no gap. As a result, in addition to providing a magnetic barrier that resists the migration of magnetically-responsive medium, the magnetic seals according to the present subject matter do so without deleteriously affecting the operation of the associated magnetically-responsive systems.

Figure 3A:
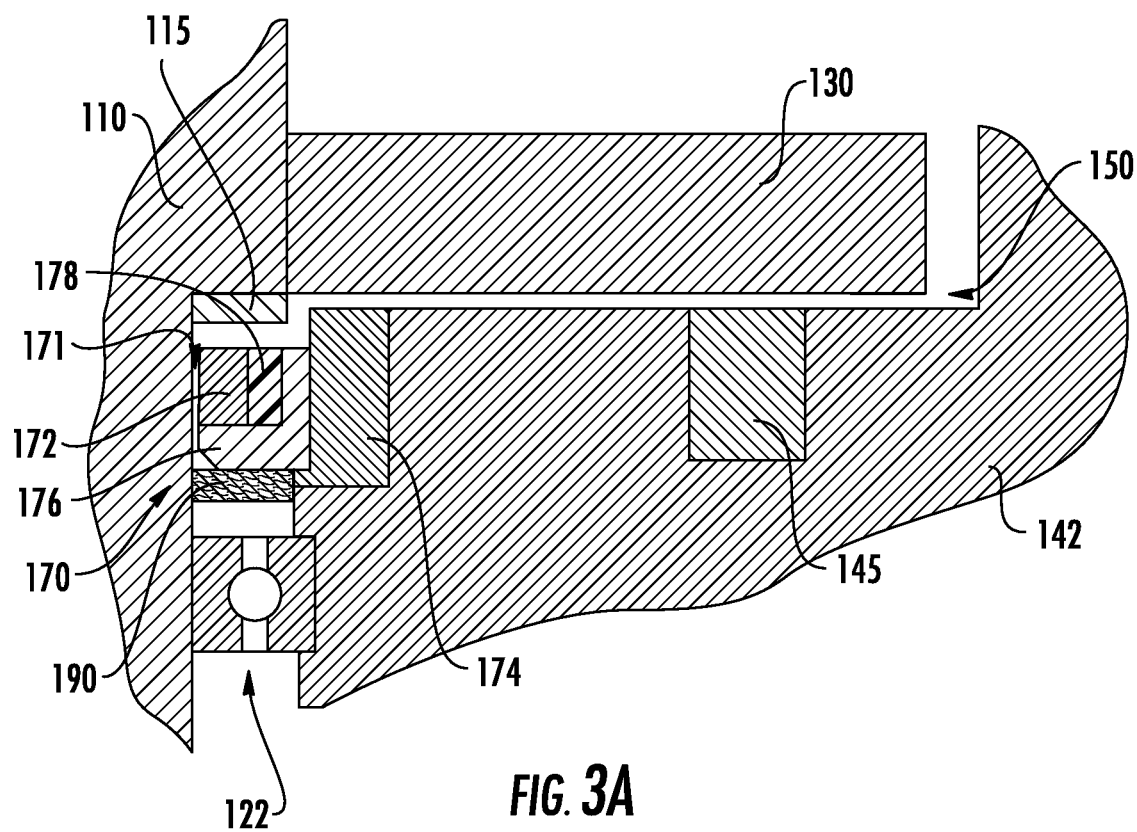
FIG. 3A is a partial side cutaway view of a magnetically-responsive device that incorporates a magnetic seal according to an embodiment of the presently disclosed subject matter.
Figure 3B:
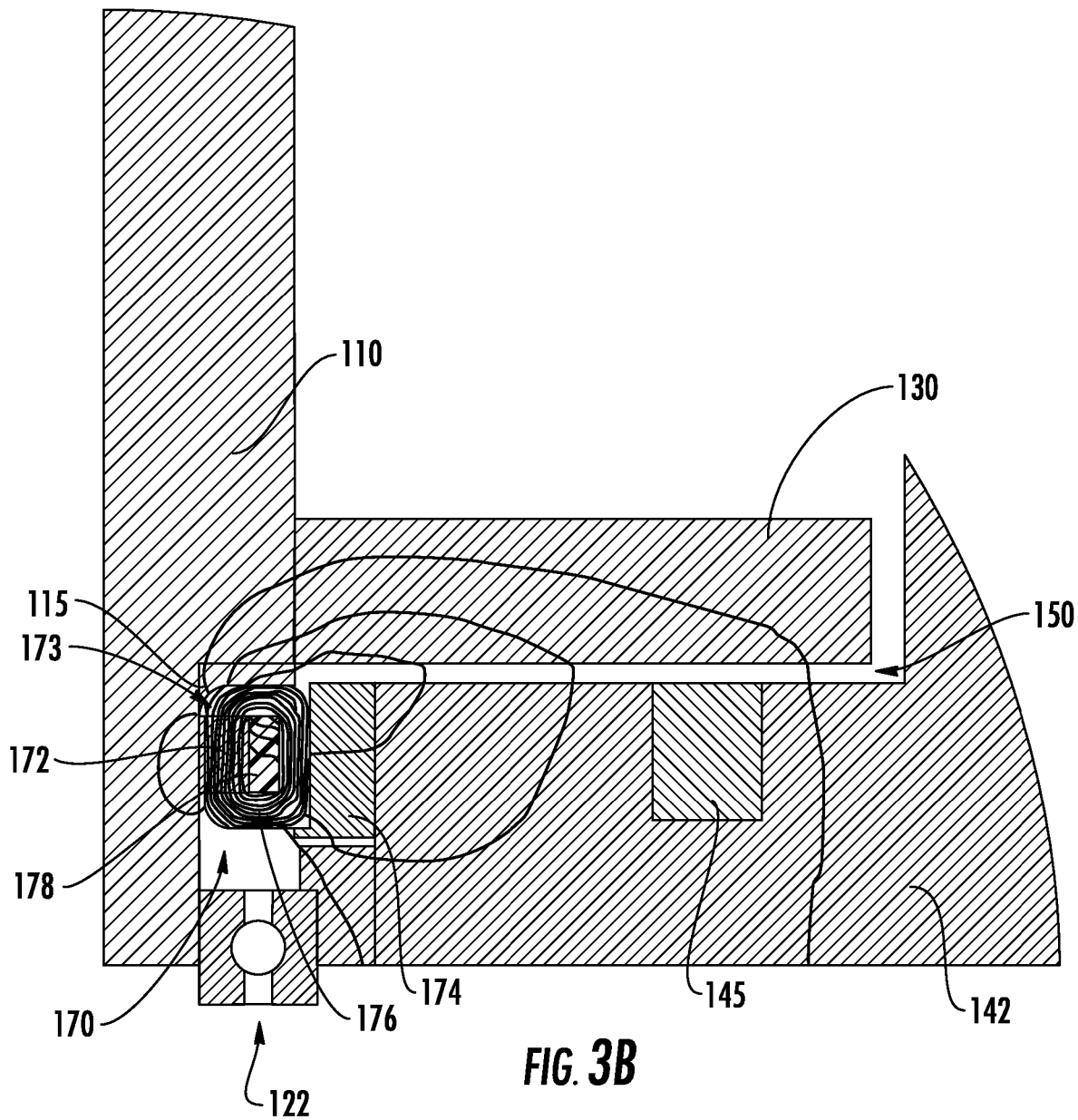
FIG. 3B is a partial side cutaway view of magnetic flux patterns in the magnetically-responsive device shown in FIG. 3A.

In an alternative configuration shown in FIG. 3A, lower magnetic seal 170 is configured such that the magnetic field generated is concentrated above the magnet. This concentration of the field is achieved by coupling a magnetic flux core 176 with ring magnet 172 to concentrate the flux to align magnetically-responsive medium in area serving as powder barrier. In some embodiments, a non-magnetic spacer 178 (e.g., a nylon ring) is positioned between ring magnet 172 and flux core 176. This non-magnetic spacer 178 is configured to radially expand the flux "crown" that is generated in the space between lower magnetic seal 170 and the rotating elements (i.e., shaft 110 and rotor 130) Referring to FIG. 3B, whereas other designs may allow flux to pass into second gap 171 between shaft 110 and ring magnet 172, this configuration pulls the magnetically-responsive medium out of second gap 171 and concentrates the magnetic flux axially and away from the central axis.

Figure 4A:
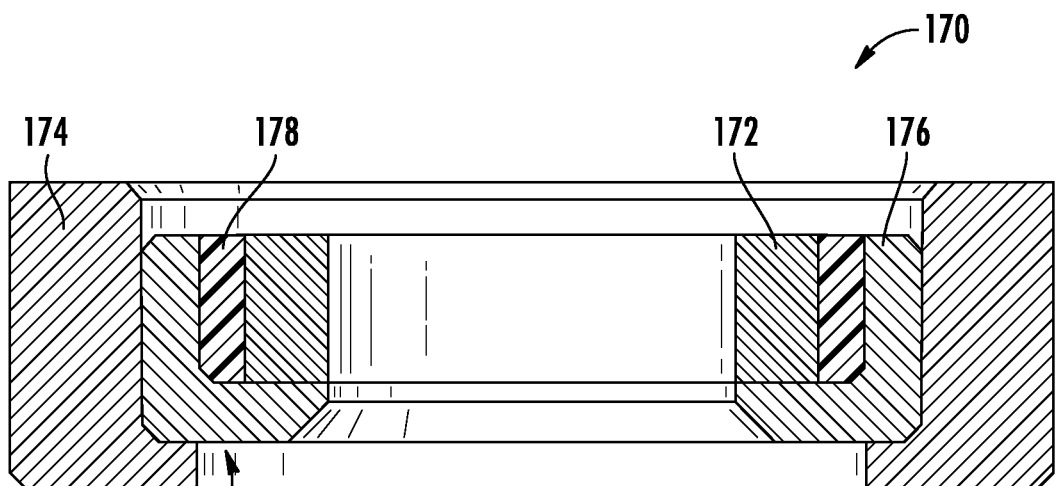
FIG. 4A is a side cutaway view of a magnetic seal for use with a magnetically-responsive device according to an embodiment of the presently disclosed subject matter.
Figure 4B:
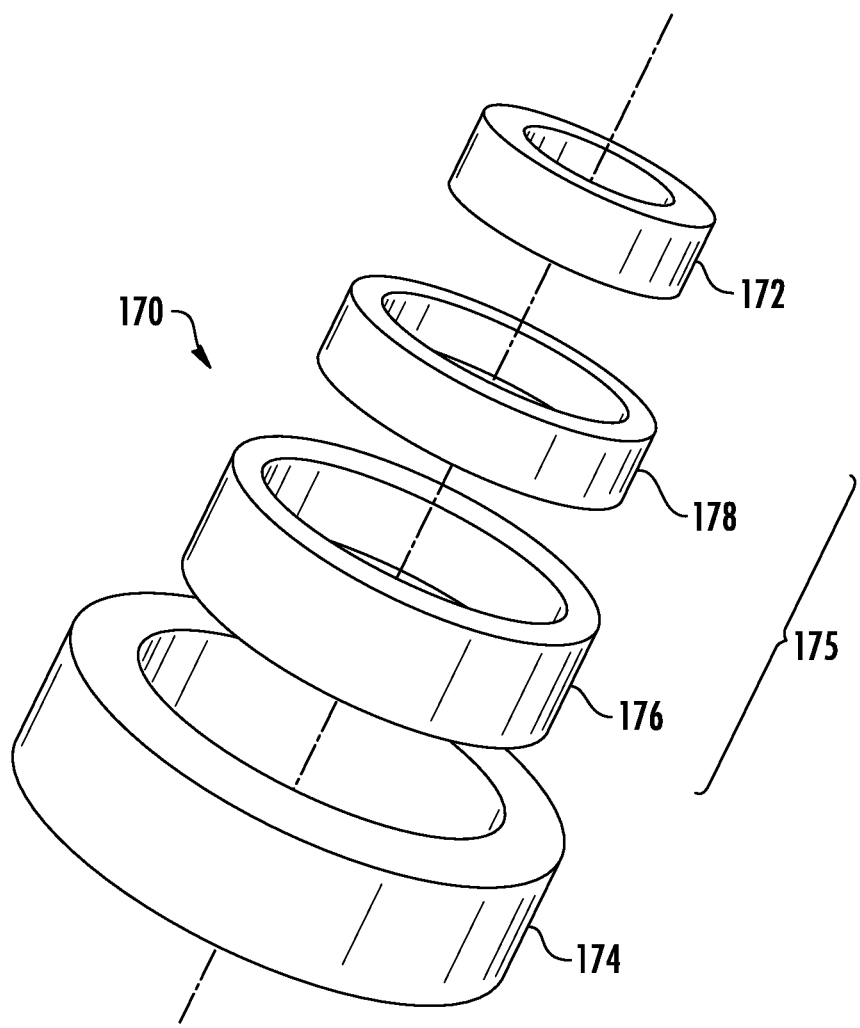
FIG. 4B is a perspective exploded view of the magnetic seal shown in FIG. 4A.

An exemplary configuration for lower magnetic seal 170 in this configuration is illustrated in FIGS. 4A and 4B. As show in this arrangement, ring magnet 172 is nested substantially concentrically within a concentrator element 175, which includes flux core 176. Referring to FIG. 4A, flux core 176 is configured to shape the magnetic field generated by ring magnet 172 to have a desired path as discussed above. As discussed above, in some embodiments, concentrator element 175 further includes spacer 178, which is configured to be positioned between ring magnet 172 and flux core 176 to prevent shorting. In the embodiments shown in FIGS. 4A and 4B, ring magnet 172, flux core 176, and spacer 178 are all nested within magnet holder 174, which is configured for attachment to a fixed element of the system (e.g., to housing 140).

In the configurations for lower magnetic seal 170 illustrated and described herein, the magnetic flux is concentrated axially and away from the central axis, which in some situations can lead to an accumulation of powder that collects around lower magnetic seal 170. In some embodiments, to impede the accumulation of the magnetically-responsive medium at or near lower magnetic seal 170 (i.e., limit the size of this concentration of powder) and thus prevent the circuit from becoming over-saturated with powder and becoming less effective, a non-magnetic element is provided in void 150 such that only a small gap (e.g., about 1 mm) remains between lower magnetic seal 170 and rotor 130. In the configuration shown in FIGS. 2A and 2B, for example, shaft 110 is itself shaped to have a diameter that varies along its length. The diameter of shaft 110 is comparatively narrow in the region of second gap 171, but shaft 110 widens in the area above lower magnetic seal 170 to extend into void 150. In this way, where shaft 110 is composed of a non-magnetic material (e.g., 316SS or 304SS stainless steel) this "step out" in the diameter of shaft 110 functions as a non-magnetic barrier to provide only a small gap above lower magnetic seal 170 to trap the accumulation of powder. Alternatively, in some embodiments such as the configuration illustrated in FIGS. 3A and 3B, a separate barrier element 115 that is composed of a non-magnetic material (e.g., 6061-T6 Aluminum or similar) is coupled with shaft 110 above lower magnetic seal 170. In some embodiments, barrier element 115 has an outer diameter that is substantially similar to a diameter of flux core 176 so that substantially the entire crown of powder that is formed is contained between these elements.

In any configuration, a magnetic seal such as those discussed above provides a non-contact seal that does not deteriorate over time. Typical sealing methods include axial/radial elastomeric contact seals. These types of seals do not do well with dry contamination, they break down over time, and they generally require contact with the rotating shaft, which imparts undesirable torsional resistance. In contrast, the non-contacting magnetic seals retain powder and prevent leakage even with a gap present between the fixed and moving components. As a result, this solution is able to replace traditional seal features entirely.

In an alternative embodiment, a magnetic seal of this kind is part of a combination sealing system that includes both magnetic elements and more conventional sealing features. Referring to FIGS. 2A and 3A, lower magnetic seal 170 is positioned near an end of void 150 between rotor 130 and pole 142, but a secondary lower seal 190 is also positioned between rotor 130 and lower bearing 122. In some embodiments, secondary lower seal 190 includes a compressed felt or elastomeric element that forms a contact seal against shaft 110. Although those having skill in the art will recognize that any of a variety of other kinds of sealing elements can be used as a secondary seal to prevent the further migration of any of the magnetically-responsive medium that is able to pass lower magnetic seal 170.

In addition to providing a seal to impede the movement of the magnetically-responsive medium out of void 150, the use of magnetic seals is also able to generate an alternative product application in some embodiments. When the systems and devices discussed above are intended to serve only as a seal to retain magnetically-responsive medium in void 150, it is desirable that shaft 110 be composed of non-magnetically-responsive medium (e.g., 316SS or 304SS stainless steel) and/or that a non-magnetic barrier element 115 be positioned between the magnetic seals and the rotating elements so that the operation of upper and lower magnetic seals 160 and 170 do not confound the ability of rotor 130 and magnetic field generator 145 to control the amount of torsional resistance of rotor 130 (and shaft 110). In some embodiments, where shaft 110 is composed of a magnetically-responsive medium (e.g., a mid/low carbon steel such as AISI-1018 or AISI-4140), operation of upper and lower magnetic seals 160 and 170 also generates a torque on shaft 110. This torque is a function of the magnetic flux path, passing through the powder medium and returning through the magnetic shaft. The flux generated in this way aligns the magnetically responsive medium, generating a shear force.

In this way, whereas typical MR brake configurations include a rotor, pole, and coil embedded in a housing, it is possible to replace the coil with magnets to generate torque between the stator, rotor, and magnetically responsive medium. This substitution provides a reliable design, but it also includes multiple components to provide both torque and structural rigidity (e.g., shaft, rotor, stator, coil, two bearings, housing, magnetically responsive powder or other medium, seals, cover, wire harness). In contrast, upper and lower magnetic seals 160 and 170 are able to function as a magnetic brake that could be dramatically simplified. As compared to typical MR brake configurations, the minimum part count for a ring magnet brake merely includes a shaft, magnet, bearings, pole, housing, and the magnetically responsive power or other material. Of course, such a design can be potentially limited in torque capability as a result of the limited diameter. That being said, application of the presently disclosed subject matter provides a low cost fixed resistance brake in some situations.

The present subject matter can be embodied in other forms without departure from the spirit and essential characteristics thereof. The embodiments described therefore are to be considered in all respects as illustrative and not restrictive. Although the present subject matter has been described in terms of certain preferred embodiments, other embodiments that are apparent to those of ordinary skill in the art are also within the scope of the present subject matter.

What is claimed is:

1. A magnetically-responsive device comprising:
   a shaft;
   a rotor interconnected to the shaft to restrain relative rotation therebetween, the rotor comprising a highly magnetically permeable material that projects radially outwardly from the shaft;
   a magnetic field generator separated from the rotor by a void;
   a magnetically-responsive medium contained within and at least partially filling the void, wherein the magnetic field generator is controllable to cause the magnetically-responsive medium to align along the flux path within the void and thereby cause a change in torsional resistance of the rotor;
   a magnetic seal axially spaced from the rotor and positioned at or near the shaft, the magnetic seal comprising a magnetic element configured to generate a magnetic field to prevent passage of the magnetically-responsive medium out of the void; and
   a non-magnetic barrier element occupying a portion of the void between the magnetic seal and the rotor, wherein the non-magnetic barrier element is configured to impede accumulation of the magnetically-responsive medium at or near the magnetic seal.

2. The magnetically-responsive device of claim 1, wherein the shaft is composed of a nonmagnetic material.

3. The magnetically-responsive device of claim 1, wherein the magnetic field generator comprises an electromagnet stator.

4. The magnetically-responsive device of claim 1, wherein the magnetic seal is separated from the shaft by a gap that prevents contact between the shaft and an internal diameter of the magnetic seal.

5. The magnetically-responsive device of claim 1, wherein the magnetic seal comprises a magnetic concentrator configured to concentrate magnetic flux to align magnetically- responsive medium in area serving as powder barrier.

6. The magnetically-responsive device of claim 5, wherein the magnetic concentrator comprises a flux core positioned about the magnetic element, the flux core being composed of a magnetic material.

7. The magnetically-responsive device of claim 6, wherein the magnetic concentrator comprises a spacer positioned between the magnetic element and the flux core, the spacer being composed of a non-magnetic material.

8. The magnetically-responsive device of claim 1, wherein the non-magnetic barrier element is coupled to the shaft for rotation therewith.

9. The magnetically-responsive device of claim 1, comprising a secondary seal axially spaced from the rotor and positioned in contact with the shaft.

10. A method for preventing passage of a magnetically-responsive medium out of a magnetically-responsive device, the method comprising:
   positioning a magnetic seal at or near a rotating shaft associated with the magnetically-responsive device, wherein the magnetically-responsive device comprises a rotor comprising a highly magnetically permeable material that projects radially outwardly from the shaft;
   generating a magnetic field to prevent passage of the magnetically-responsive medium along the shaft away from the magnetically-responsive device; and
   positioning a non-magnetic barrier element between the magnetic seal and the rotor, wherein the non-magnetic barrier element impedes accumulation of the magnetically-responsive medium at or near the magnetic seal.

11. The method of claim 10, wherein positioning a magnetic seal at or near a rotating shaft comprises positioned a magnetic seal that is sized such that an inner diameter of the magnetic element is greater than an outer diameter of the rotating shaft.

12. The method of claim 10, comprising coupling a magnetic concentrator to the magnetic seal, the magnetic concentrator being configured to concentrate magnetic flux to align magnetically-responsive medium in area serving as powder barrier.

13. The method of claim 12, wherein coupling a magnetic concentrator to the magnetic seal comprises positioning a flux core about a magnetic element of the magnetic seal, the flux core being composed of a magnetic material.

14. The method of claim 13, wherein coupling a magnetic concentrator to the magnetic seal comprises positioning a spacer between the magnetic element and the flux core, the spacer being composed of a non-magnetic material.

15. The method of claim 10, comprising positioning a secondary seal in contact with the shaft.

* * * * *